(No Model.) 2 Sheets—Sheet 1.

B. HUBER & W. K. HODGMAN.
MECHANICAL MOVEMENT.

No. 348,162. Patented Aug. 24, 1886.

Witnesses
Fred L. Emery.
John F. C. Praubert.

Inventors.
Berthold Huber
Willis K. Hodgman.
by Crosby & Gregory attys (No Model.) 2 Sheets—Sheet 2.

B. HUBER & W. K. HODGMAN.
MECHANICAL MOVEMENT.

No. 348,162. Patented Aug. 24, 1886.

Witnesses
Fred L. Emery.
John F. C. Brunkhort

Inventors
Berthold Huber
Willis K. Hodgman
by Crosby & Gregory attys

UNITED STATES PATENT OFFICE.

BERTHOLD HUBER AND WILLIS K. HODGMAN, OF TAUNTON, MASS., ASSIGNORS TO THE HUBER PRINTING PRESS COMPANY, OF SAME PLACE.

MECHANICAL MOVEMENT.

SPECIFICATION forming part of Letters Patent No. 348,162, dated August 24, 1886.

Application filed February 15, 1886. Serial No. 191,964. (No model.)

*To all whom it may concern:*

Be it known that we, BERTHOLD HUBER and WILLIS K. HODGMAN, both of Taunton, county of Bristol, and State of Massachusetts, have invented an Improvement in Mechanical Movements, of which the following description, in connection with the accompanying drawings, is a specification, like letters on the drawings representing like parts.

This invention has for its object to improve that class of mechanical movement commonly known as the "Napier motion," the mechanism to be herein described containing a traveling carriage or bed having a series of studs or pins, which are engaged by a continuously-rotating reversing-gear, the rotation of the said gear causing the carriage or bed to be reciprocated, the gear engaging first the upper and then the lower sides of the said row of pins or studs, which constitute teeth of a rack.

The particular features in which our invention consists will be hereinafter described, and pointed out in the claims at the end of this specification.

Figure 1:
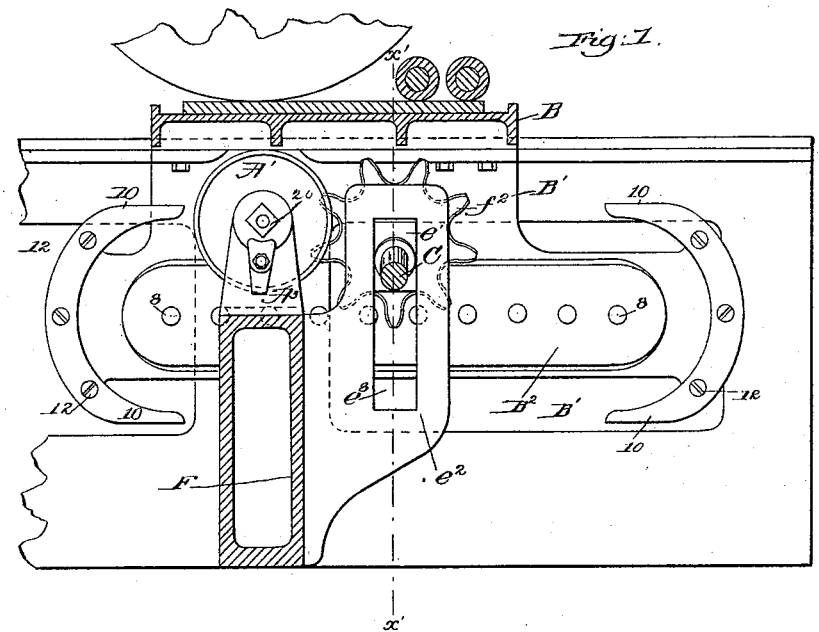
Figure 2:
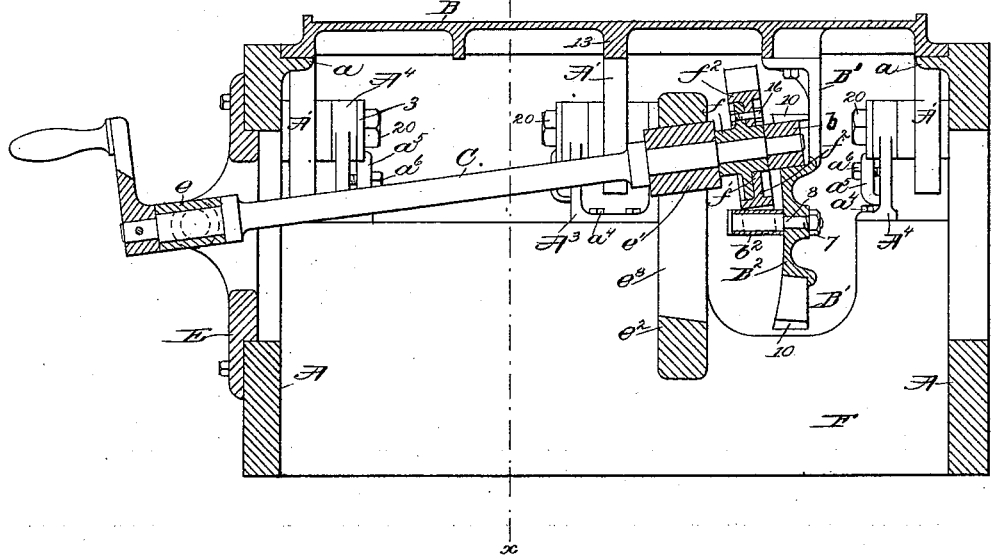
Figure 3:
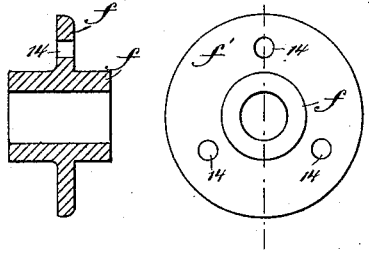
Figure 4:
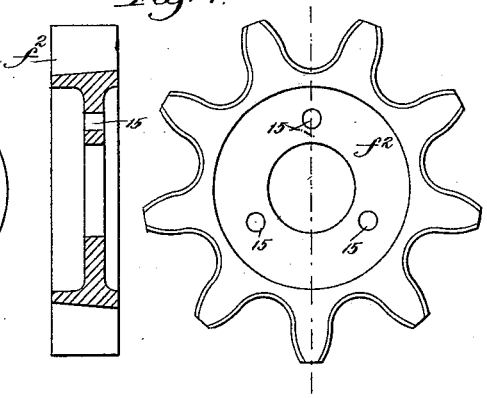
Figure 5:
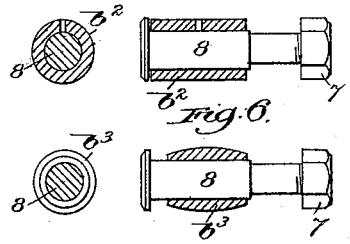
Figure 6:
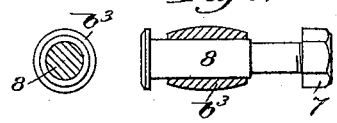
Figure 7:
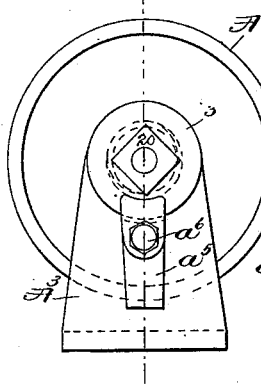

Figure 1 is a longitudinal section of a mechanical movement embodying our invention, the section being in the line $x\ x$, Fig. 2. Fig. 2 is a cross-section of a mechanical movement embodying our invention, the line of section being distinguished by the line $x'\ x'$, Fig. 1. Fig. 3, in section and end view, represents the independent boss or hub of the reversing-gear. Fig. 4, in section and end view, shows the toothed rim of the reversing-gear detached from the hub. Fig. 5 shows a cross and longitudinal section of one of the studs and its bushing removed from the carriage or bed, the said stud and bushing constituting a tooth of the rack. Fig. 6 shows like views of one of the endmost studs; Fig. 7, an end view of one of the rollers on which the carriage or bed runs and its holding-stand, and Fig. 8 a section of Fig. 7 on the dotted line $x^2\ x^2$.

Referring to the drawings, A represents the stationary side frames of a machine, having lateral flanges $a$, to constitute ways for a carriage or bed, B, which is to be reciprocated in accordance with our invention, the said flanges being cut away at suitable intervals for the passage of the peripheries of rollers A', upon which rest portions of the under side of the carriage or bed. These rollers, to reduce the friction during the reciprocation of the carriage, are mounted upon studs $a^2$, the central or body portions of which are eccentric between their end portions or journals, 2 2, the partial rotation of the said studs adjusting the height of the rollers, and consequently of the carriage. These studs are supported in stands $A^3\ A^4$, erected upon a cross-girt, F, and attached thereto by bolts $a^4$.

Figure 8:
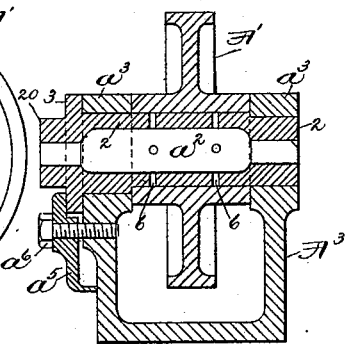

The studs $a^2$ in the stands $A^4$ have one of their ends supported in bearings connected with the frame-work A; but the stud supported by the stand $A^3$ is supported at both ends by the said stand, as shown in Fig. 8. Each stud $a^2$ has a flange, $s$, which, when the stud has been turned sufficiently to place the periphery of the roller A' thereon in proper position, is acted upon by a clamping device composed of a plate, $a^5$, and a screw, $a^6$. The studs are made hollow and provided with oil-ducts, to thus permit oil to be introduced between the stud and the hub of the roller surrounding it. Each stud $a^2$ has at one end a squared portion, 20, to receive a wrench by which to turn it.

Attached to and depending from the carriage or bed B is a bracket, B', having a central guide, B², provided with straight sides and rounded ends, (see Fig. 1,) and at the ends of the said central guide are shoes 10, attached to the bracket B' by screws 12.

At the longitudinal center of the central guide, B², is a rack composed, as herein shown, of a series of shouldered bolts attached thereto by nuts 7, all the said bolts except those constituting the end teeth of the rack being provided with substantially cylindrical sleeves $b^2$, as shown in Figs. 2 and 5; but the endmost bolts of the rack are provided with sleeves $b^3$, which are of substantially oval form, and are shorter than the bolts outside the said central guide, in order that the said sleeves may slide as well as rotate as the reversing-gear, to be described, passes from the upper to the lower side of the rack, or vice versa. The said sleeves have been found very efficient in reducing wear between the studs and the reversing-gear, and enabling the carriage or bed to be moved with the minimum of friction. The reversing-shaft C has its outer bearing in a swivel-hanger, $e$, and its inner one in a square box, $e'$, adapted to slide up and down in a slot, $e^3$, of a bracket, $e^2$, attached to the cross-piece or stringer F.

The reversing-gear consists of a cylindrical hub, $f$, having an annular flange, $f'$, and provided with a series of holes, 14, and of an annular flange, $f^2$, having a series of holes, 15, to receive bolts 16, by which to attach the toothed annulars to the flange of the hub. The hub $f$ will in practice be fixed to the shaft C, and in case of wear of the toothed portion of the reversing-gear, or its breakage, the toothed portion may be readily removed without removing the hub from the shaft C. The inner end of the shaft C has upon it a roller, $b$, which rests against the edges of the central portion, $B^2$, to which are attached the studs or bolts referred to, and the said wheel is kept against the said central portion, the latter acting as a track for it, by contact of the box $e'$ with the bracket $e^2$ at the upper or lower end of the slot therein, the said roller and box described co-operating with the bracket and the central portion, $B^2$, to insure the correct engagement of the reversing-gear with the teeth of the rack.

In order to secure proper contact between the teeth of the reversing-gear and the rack when the reversing-gear is above as well as below the rack, the teeth of the said reversing-gear are shaped substantially as shown in the drawings, to maintain contact with the rack throughout the whole length of the teeth—that is to say, the side walls of the teeth are not parallel, as in usual toothed gears, but are inclined, as shown best by the two parallel lines in the right-hand view of Fig. 4, and as indicated in the sectional or left-hand view of said figure; or, in other words, the distance apart of the side walls of the teeth of the said gear at one face thereof is less than at the opposite face of the said gear, in order to prevent the cramping of the teeth on the sleeves applied to the studs of the rack, and yet maintain contact between the teeth and sleeves, notwithstanding the fact that the gear is attached to one end of a pivoted shaft, such construction of gear and shape of its teeth being very essential to equalize motion and obviate undue friction. The reversing-shaft C stands at an angle to the bed-rack and to the bushing upon the studs 8 thereof.

We claim—

1. The reciprocating bed and the attached rack composed of studs having loose sleeves thereon, combined with the reversing-shaft and the reversing-gear provided with teeth having side walls divergent throughout and farther apart at one face of the gear than at the other, substantially as shown, to maintain contact with the sleeves, as set forth.

2. The reciprocating bed, its attached rack composed of studs and loose sleeves, the endmost sleeves being made oval and shorter than the studs, in order that they may both rotate and move thereon longitudinally, combined with the inclined reversing-shaft and the reversing-gear having its teeth shaped substantially as shown, for the purpose set forth.

3. The reciprocating carriage or bed and a frame provided with ways to receive said carriage or bed, combined with the rollers A' and their eccentric studs and bearings therefor, the rotation of the studs adjusting the height of the rollers and of the carriage or bed thereon, substantially as described.

4. The reciprocating carriage or bed, the rolls to support it, and the eccentric studs upon which the said rolls are mounted, and flanges attached to the said studs, combined with clamping devices to hold the said studs in adjusted position, substantially as described.

In testimony whereof we have signed our names to this specification in the presence of two subscribing witnesses.

BERTHOLD HUBER.
WILLIS K. HODGMAN.

Witnesses:
EDWARD P. COLEMAN,
E. L. CROSSMAN.